United States Patent
Hamaguchi et al.

(10) Patent No.: US 7,057,838 B2
(45) Date of Patent: Jun. 6, 2006

(54) MAGNETIC DISK DEVICE HAVING A WRITE HEAD TO WRITE BY SHIFTING IN A RADIAL DIRECTION

(75) Inventors: Takehiko Hamaguchi, Fuchu (JP); Atsushi Nakamura, Kodaira (JP); Yasutaka Nishida, Kodaira (JP); Hisashi Takano, Kodaira (JP); Yohji Maruyama, Iruma (JP); Hiroshi Ide, Kodaira (JP); Hideki Sawaguchi, Kokubunji (JP); Futoshi Tomiyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 269 days.

(21) Appl. No.: 10/407,209

(22) Filed: Apr. 7, 2003

(65) Prior Publication Data

US 2003/0189774 A1   Oct. 9, 2003

Related U.S. Application Data

(63) Continuation of application No. 09/601,738, filed on Aug. 7, 2000, now abandoned.

(51) Int. Cl.
G11B 5/02 (2006.01)

(52) U.S. Cl. .................................................. 360/55

(58) Field of Classification Search ................ 360/118, 360/66, 55, 75, 31, 119, 122, 48, 78.14, 78.04
See application file for complete search history.

(56) References Cited

U.S. PATENT DOCUMENTS

| | | | |
|---|---|---|---|
| 4,949,199 A | 8/1990 | Yunoki | |
| 5,889,630 A | 3/1999 | Karube et al. | |
| 5,940,237 A | 8/1999 | Takagi | |

FOREIGN PATENT DOCUMENTS

| | | |
|---|---|---|
| JP | 58-171702 | 10/1983 |
| JP | 59-168905 | 9/1984 |
| JP | 63-191304 | 8/1988 |
| JP | 4-067402 | 3/1992 |
| JP | 6-84284 | 3/1994 |
| JP | 9-138987 | 5/1997 |

OTHER PUBLICATIONS

Title Page with abstract PCT/JP98/03929 filed Sep. 2, 1998 entitled *Information Recording/Reproducing Device*.

*Primary Examiner*—David Hudspeth
*Assistant Examiner*—Glenda P Rodriguez
(74) *Attorney, Agent, or Firm*—Kenyon & Kenyon LLP (57) ABSTRACT

In the present invention, by making the width of the write element larger than the track pitch and securing a write magnetic field strong enough to reverse the magnetization of the magnetic layer, and further by writing while shifting a write head comprising the write element, a magnetic disk drive, of which the track width is narrower than the write element width, and the storage capacity is large, is realized.

17 Claims, 11 Drawing Sheets

| | PROCESS 1 → | PROCESS 2 → | PROCESS 3 |
|---|---|---|---|
| | MOVE THE DATA OF TRACK 103 TO TRACK 102 | MOVE THE DATA OF TRACK 104 TO TRACK 103 | UPDATE LAST POINTER |
| | UPDATE THE ITEM 103 OF SHIFT ADDRESS TABLE | UPDATE THE ITEM 102 OF SHIFT ADDRESS TABLE | UPDATE THE ITEM 104 OF SHIFT ADDRESS TABLE |
| | LAST POINTER | LAST POINTER | LAST POINTER |
| | 104 | 104 | 104 → 103 |
| TRACK NUMBER | CROSS REFERENCE | CROSS REFERENCE | CROSS REFERENCE |
| ⋮ | ⋮ | ⋮ | ⋮ |
| 101 | 0 | 0 | 0 |
| 102 | 2 | 2 → 1 | 1 |
| 103 | 0 → −1 | −1 | −1 |
| 104 | X | X | X → 0 |
| 105 | 0 | 0 | 0 |
| ⋮ | ⋮ | ⋮ | ⋮ |

MAGNETIC DISK DEVICE HAVING A WRITE HEAD TO WRITE BY SHIFTING IN A RADIAL DIRECTION

This application is a continuation application of Ser. No. 09/601,738, filed Aug. 7, 2000 and now abandoned, which was a US National phase application of PCT/JP/00884, filed Aug. 7, 2000, both of which are incorporated herein by reference in their entirety.

TECHNICAL FIELD

The present invention relates to a magnetic disk drive wherein data are written on and read from magnetic disks by composite heads.

BACKGROUND ART

A magnetic disk drive moves heads radially over rotating disks, positions the heads over specific data tracks accurately, and writes data on and reads data from the disks magnetically.

Figure 3:
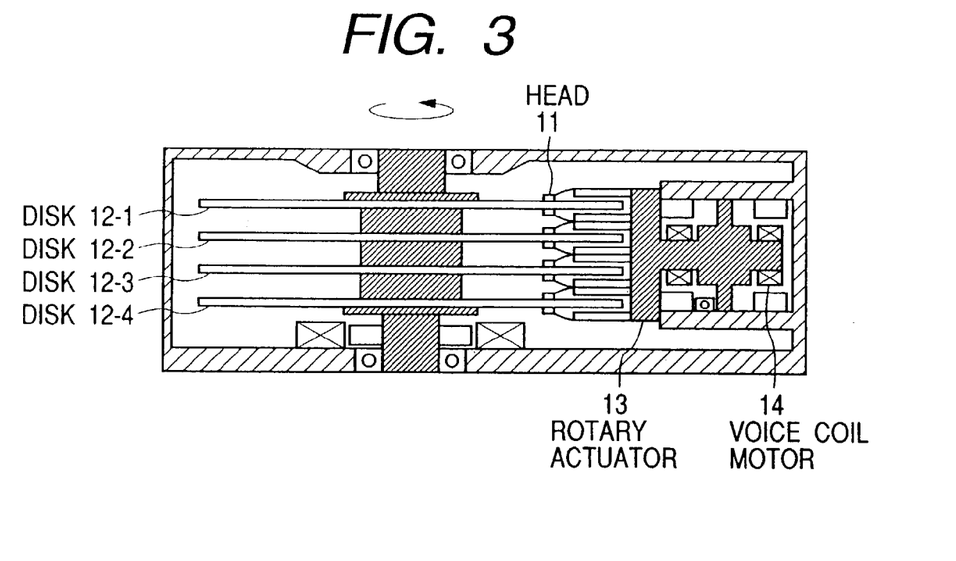
FIG. 3 is a schematic sectional view of a typical magnetic disk drive.

FIG. 3 is a schematic sectional view of a typical magnetic disk drive. The magnetic disk drive has four disks 12 and eight heads 11. The eight heads 11 are supported by a rotary actuator 13 which is driven by a voice coil motor 14. On each side of each disk 12, a head 11 writes and reads data.

Figure 4:
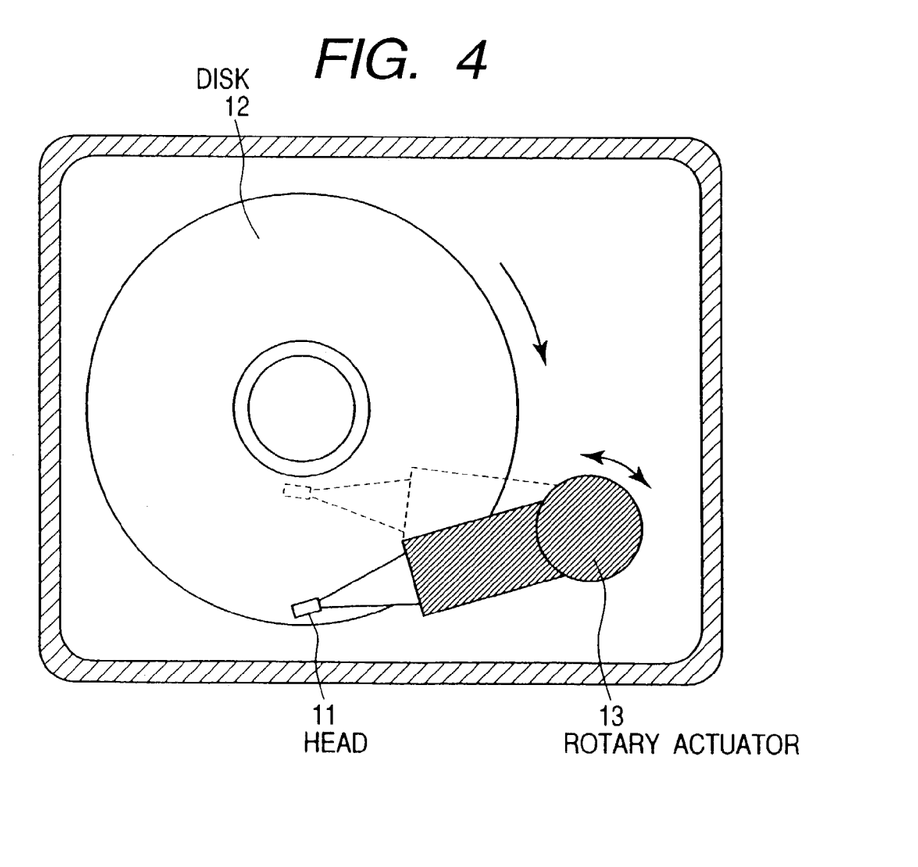
FIG. 4 is a schematic plan view of the magnetic disk drive of FIG. 3.

FIG. 4 is a schematic plan view of the magnetic disk drive. The voice coil motor 14 drives the rotary actuator 13 to move the heads 11 radially over the rotating disk 12.

Figure 5:
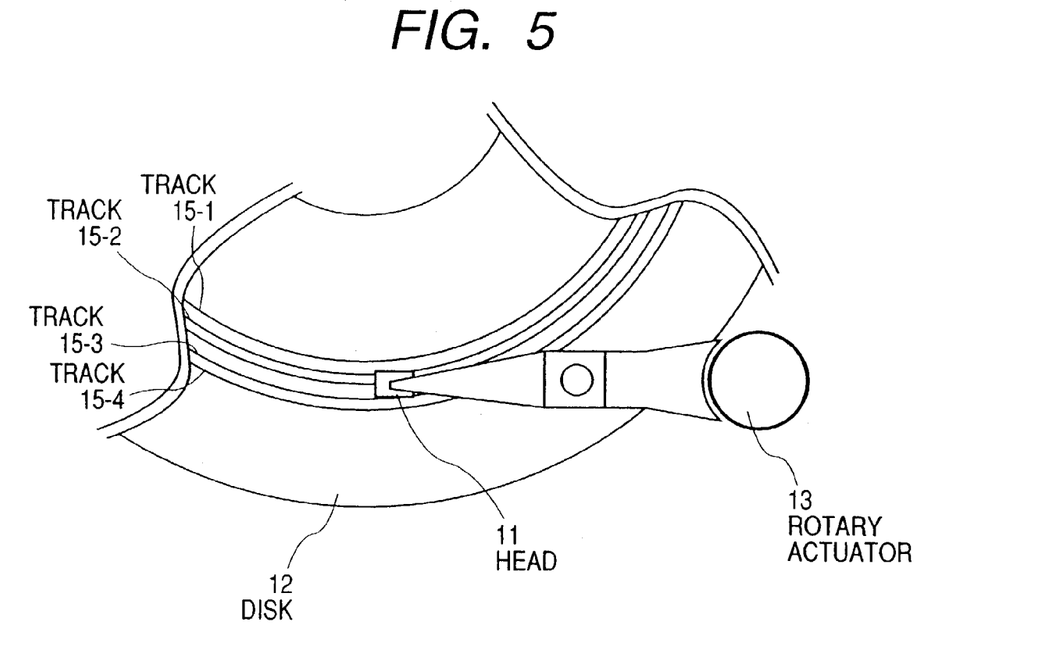
FIG. 5 is a schematic plan view of part of the magnetic disk drive of FIG. 3.

FIG. 5 is a schematic plan view of part of the magnetic disk drive. Special magnetic data to indicate the positions of the heads are written on the disks 12 before the magnetic disk drive is shipped from the factory. The CPU (central control unit) determines the electric power to be given to the voice coil motor 14 to move the rotary actuator 13 and position the head 11 on a specific track 15 accurately. Although the tracks 15 on the disk is indicated by using solid lines in FIG. 5, they are formed magnetically and therefore not visible optically.

Figure 6:
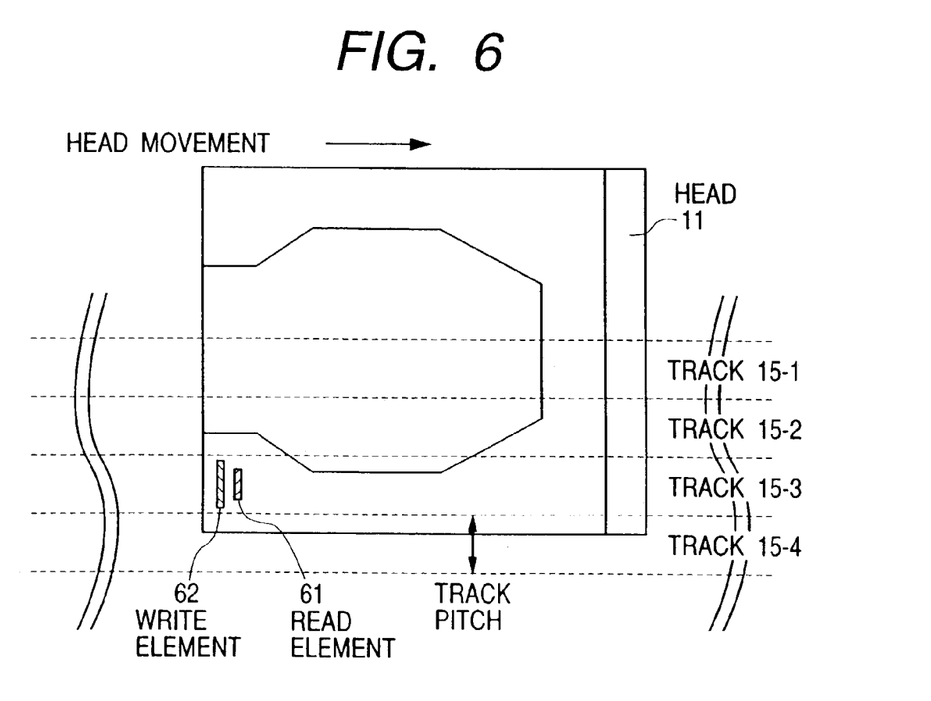
FIG. 6 is a plan view of the head of the magnetic disk drive of FIG. 3.

FIG. 6 is a plan view of the head of the magnetic disk drive. The head 11 is of a write/read separation type. A composite head consists of a magnetoresistance-effect read element 61 and an inductive write element 62 both laminated on one and the same slider. The MR element, which makes use of the magnetoresistance effect of iron nickel alloy, is widely used as the read element 61. On the other hand, the GMR element, which is non-magnetic layer sandwiched between magnetic layers, is now being put to practical use. Because the MR element is highly sensitive in reading short-wavelength recorded data, it is effective in increasing the recording density of magnetic disk drives. As magnetoresistance-effect read elements, represented by the MR element, is not capable of writing data on a magnetic disk, an inductive element, which consists of minute magnetic poles and coils formed by photo lithograph, is used as the write element 62. The working principle of the inductive element is the same as that of the tape recorder in common use. Most of the magnetic disk drives recently put on the market use the above composite head. Although each of the read and the write element 61 and 62 is represented by a rectangle to indicate its width and position visually in FIG. 6, the rectangle does not represent the actual optical shape of said element. This is also true of the other Figures.

The main feature of magnetic disk drives is that data once written on a disk can be replaced with new data. By writing new data on a data track already holding data, most parts of the old information are masked. Because this writing method, called "direct overwrite method," requires no erase process, high writing efficiency can be achieved by using this method, which therefore is adopted by all magnetic disk drives.

As shown in FIG. 6, the width of the write element 62 is made smaller than the track pitch so that the write element 62 does not affect the adjacent tracks and, thereby, the reliability of the magnetic disk drive can be secured. While the write element 62 is writing data on the disk, its magnetic field extends beyond its width toward the adjacent tracks. Therefore, if the write element 62 is as wide as the track pitch, it affects an adjacent zone in the adjacent track on each side of the track which it is writing data on. The width of a track including the adjacent zones on both sides of the track is called "erase track width." As disclosed in the Japanese Unexamined Patent publication No. 59-168905, the width of the read element 61 is preferably made smaller than the write-track width to such a degree as the necessary SN ratio can be secured, the positioning errors in writing and reading taken into account. Thus, by setting the widths of the write and the read element 62 and 61 properly, the risk can be avoided that the write element 62 affects the adjacent tracks, destroying data in them. Furthermore, by doing so, the frequency of retrials during the reading of data can be reduced, which increases the performance of the magnetic disk drive, and a proper SN ratio can be secured, which reduces the bit error rate.

Because magnetoresistance-effect read elements, represented by the MR element, features its excellent sensitivity in reading data, it is effective in raising the recording densities in the rotating direction of, and radially of, the magnetic disk.

On the other hand, because the inductive write element 62 must have at least a sectional area capable of letting through a magnetic flux which is required to reverse the magnetization of the magnetic layer of the magnetic disk. Therefore, reducing the track width is liable to increase the height of the magnetic poles. For example, the magnetic poles with a write-track width of 1.5 µm are as height as 3 µm or more.

On the other hand, if the ratio of the height to the width, or aspect ratio, of a magnetic pole is made large far beyond 1.0, its structural reluctance becomes large and it becomes difficult to align the magnetic anisotropy of the poles in one direction. Thus, the pole becomes less capable of letting the magnetic flux through effectively. If the strength of the magnetic field emitted from the writing gap of the magnetic poles is reduced, the overwrite performance of the write element 62 is reduced. The transition length of recorded magnetization becomes long and the resolution becomes low. The noise elements due to the medium increase and it becomes difficult to secure the necessary SN ratio, of the magnetic disk drive.

In order to prevent the reduction of the write-track width of the poles from reducing the reluctance of the poles, a technique of reducing the sectional areas required of the magnetic poles by using a material of high saturation magnetic flux density and a technique of reducing the sectional areas of only the tops of the magnetic poles are devised. However, technology to produce magnetic materials of which the saturation magnetic flux density is much higher than that of the currently available iron nickel alloy of a high iron content have yet to be established. To reduce the sectional areas of the tops of the magnetic poles requires a complex process with a long tact time, increasing the manufacturing cost.

In accordance with the prior art, there is a lower limit on the width of the magnetic poles of the write element 62. If the write-track width is reduced below 0.7 μm, a sufficient SN ratio cannot be secured. To solve this problem, the Japanese Unexamined Patent publication No. 7-192226 disclosed a technique of making the write-track width of the magnetic poles of the write head larger than the track pitch of the magnetic disk. In accordance with the invention, a track density higher than that obtainable at the above-mentioned lower limit of 0.7 μm on the write-track width may be achieved. However, it is required to make the read track width of the read head extremely smaller than the track pitch. The smaller the read track width of a read head is, the smaller its output is. Thus, in order to raise the track density by using the above technique, it is necessary to develop a technique to improve the read head.

Under the circumstances, it is hoped to develop a technique to raise the recording density of magnetic disk drives by using a write element of which the magnetic poles are wide enough to generate a strong magnetic field and a read element of which the read track is wide and of which the read sensitivity is high and, at the same time, by reducing the width of data tracks.

SUMMARY OF THE INVENTION

The above problem can be solved by making the write track width formed by the write element larger than the track pitch and the read track width formed by the read element smaller than the track pitch and, at the same time, by shifting the write element in the radial direction of the magnetic disk track by track when writing and carrying out reading one track alone independently when reading the magnetic information from said magnetic disk.

The above problem can also be solved by making the width of erase tracks, which is formed by the write head, as wide as the track pitch multiplied by an integral number and shifting the write element radially track by track in order.

Besides, the above problem can be solved by making the write element twice or more as geometrically wide as the read element and shifting the write element radially track by track in order.

Moreover, by providing a shift address table and using a technique to shift physical addresses in addition to the above techniques, the above problem can be solved and, at the same time, the performance of a magnetic disk drive incorporating these techniques can be increased. Furthermore, by carrying out the defragmentation of the shift address table in accordance with instructions or demands from the user or the interrupt requests from micro programs, the initial performance of magnetic disk drives can be maintained over a long time period.

In addition, by dividing the disk into two or more circular zones of different track pitches and further dividing each circular zone into areas of different pitches, areas of the same performance as conventional magnetic disk drives and areas of twice or more as high density as conventional magnetic disk drives can be secured in a single magnetic disk drive. Besides, by providing a function to set boundaries among the areas of different track pitches, the magnetic disk can be optimized to increase the performance according to each application program. Moreover, by providing a function to store file-allocation data for the operating system to manage files in an area of the wide track pitch, the performance of the input into and output from the disk by the operating system can be increased.

DETAILED DESCRIPTION

First Embodiment

The basic structure of a magnetic disk drive of the present invention is almost the same as that of magnetic disk drives of the prior art described referring to FIGS. 3, 4, and 5. Comparing FIG. 1 showing an embodiment of the present invention and FIG. 2 showing an example of the prior art, the relation between the write- and read-element width and the track pitch will now be described.

Figure 1:
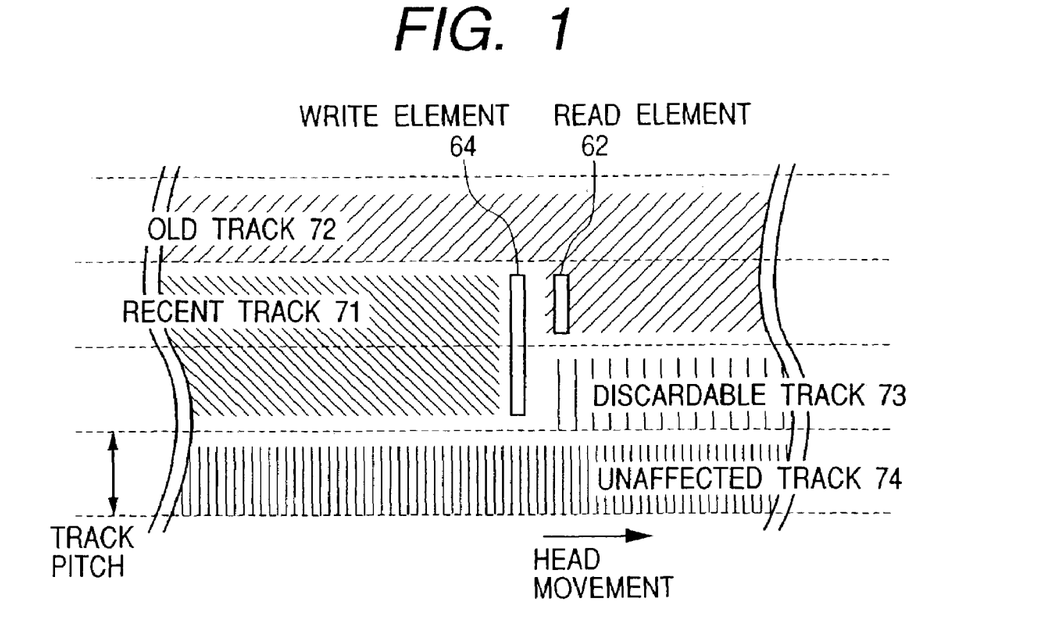
FIG. 1 is an illustration to explain the relation between the widths of a write and a read head and the track pitch of the first embodiment of magnetic disk drive of the present invention.
Figure 2:
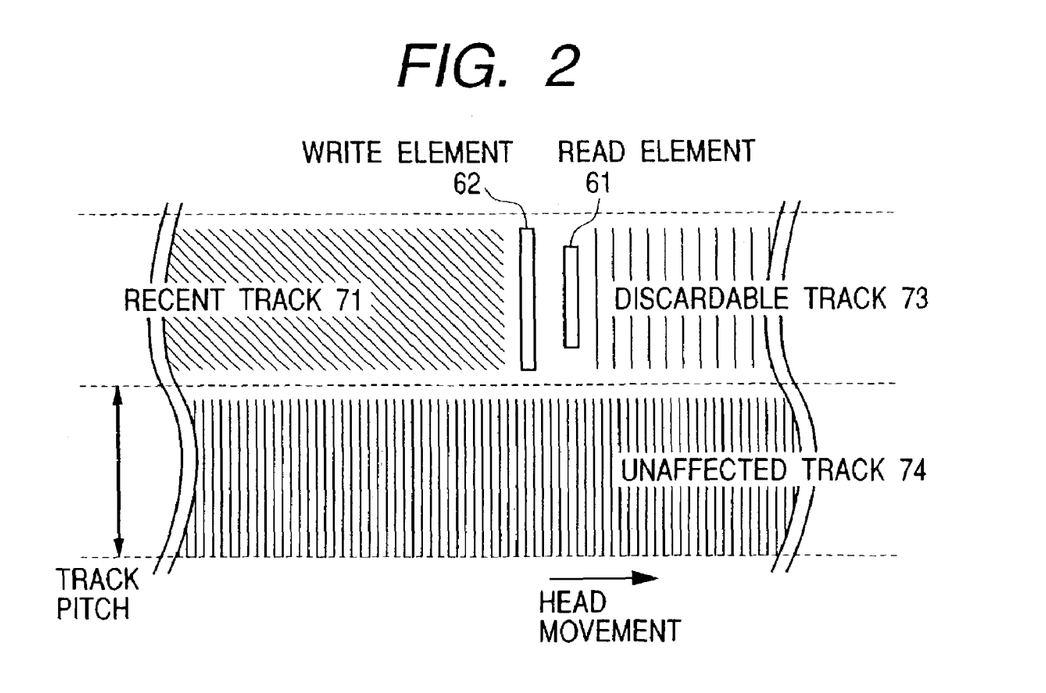
FIG. 2 is an illustration to explain the relation between the widths of a write and a read head and the track pitch of a conventional magnetic disk drive.

In either of FIGS. 1 and 2, the head moves relatively to the disk from the left to the right to write and read data. Data are written in patterned areas, or recent trucks 71, to the left of the read element 63 or the write element 64 in FIGS. 1 and 2. The data in patterned areas, or discardable tracks 73, to the right of the read element 63 or the write element 64 are replaced by new data. The read element 63 or the write element 64 do not affect the tracks 74, leaving the data in them as they are.

The track pitch on the disk of FIG. 1 is reduced to about a half of that on the disk of FIG. 2 so that the former disk can store twice as much data per unit area as the latter disk. The width of a read element 63 of the present invention is made smaller than the track pitch so as not to read any data on the adjacent tracks. Thus, the width of the read element 62 of the present invention is about half of that of the read element 61 of the prior art. On the other hand, the write element 64 of the present invention is made wider than the track pitch and as wide as the write element 62 of the prior art. Accordingly, the write element 64 can generate a sufficiently strong write magnetic field, and hence the magnetic disk drive of the present invention can achieve a good overwrite characteristic and a high SN ratio.

The magnetic disk drive of the present invention is provided with a composite head comprising a write element 64 which is wider than the track pitch. Therefore, while data are written on a track, the data in an adjacent track can be reshaped into a data track narrower than the track pitch. Namely, while data are written on a track, the head is kept at the position shown in FIG. 1 by following control. The zone in the recent write track 72 which interferes with the present track 71 is overwritten and the data in the zone are erased. Thus, the recent write track 72 is reshaped into a data track of which the width is enough for the read element 63 to read data in it. By keeping the head in the position shown in FIG. 1 and writing data on the current track 71, the interference with the adjacent track 74 on the other side can be avoided.

In the embodiment of FIG. 1, the read element 63 is narrower than the track pitch. However, as the technology for separating the magnetic data picked up on the adjacent tracks from the magnetic data of the current track advances in the future, it may become possible to make the read element wider than the track pitch. Besides, by being based on the coding method of adjacent tracks, the data on the adjacent two tracks can be read simultaneously and, thereby, the transfer rate of data can be raised.

Figure 7:
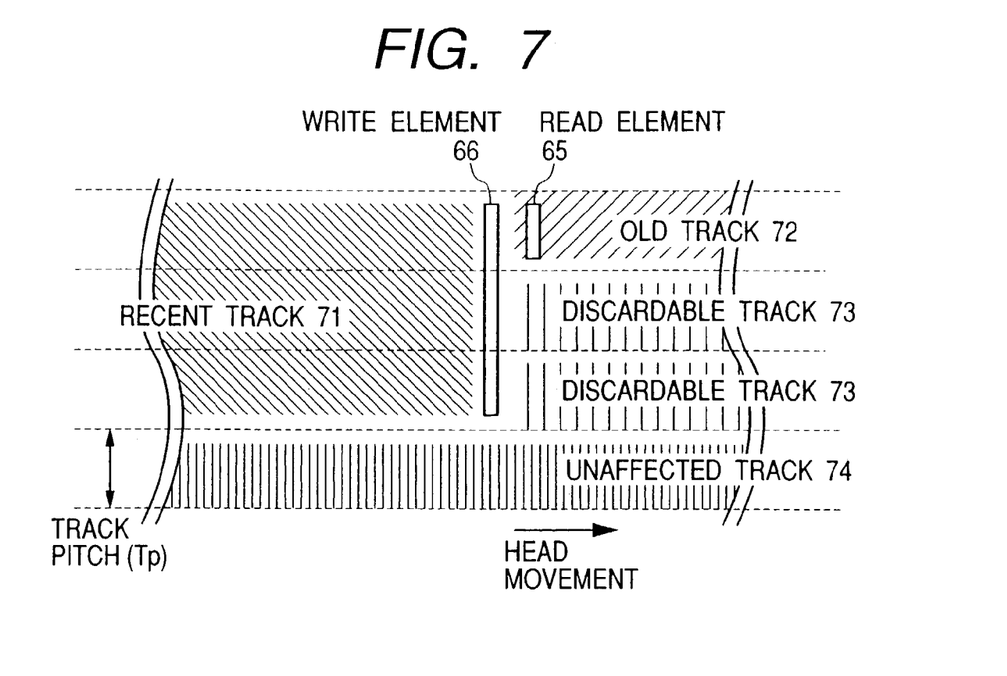
FIG. 7 is an illustration to explain the relation between the widths of a write and a read head and the track pitch of the second embodiment of magnetic disk drive of the present invention.

FIG. 7 shows the relation between the write- and read-element width and the track pitch of the second embodiment of the present invention. The magnetic disk drive of this embodiment has a composite head comprising a write element 66 which is about three times as wide as the track pitch. Accordingly, a pattern shown as the discardable track 73, which is overwritten and of which the data are erased, is twice as wide as the track pitch. Thus, by using the write element 66 about three times as wide as the track pitch, a magnetic disk drive of a narrower track pitch can be achieved. The write element may be made four, five, or six times as wide as the track pitch to raise the recording density further.

In any of the above embodiments, data tracks corresponding to a small track pitch can correctly be formed one by one by writing data in one direction radially of the disk. The present invention provides a magnetic disk drive which is inexpensive, of which the storage capacity is large, and which is suitable especially for storing images in which serial-transfer requests are frequently issued. By providing a magnetic disk drive of the present invention with dummy tracks corresponding to the image-transfer unit, the performance of the magnetic disk drive can be raised remarkably. For example, by making the transfer unit, or block capacity, as large as image data for 10 seconds or so, the decline of format efficiency due to dummy tracks can be held down and a magnetic disk drive with random access performance of the same level as that of conventional magnetic disk drives can be achieved. Besides, by transferring image data by variable blocks corresponding to joints between images, the decline of format efficiency due to dummy tracks can be minimized to a negligible degree.

The Japanese Unexamined Patent publication Nos. 1-94574 and 5-298840 disclosed a technique of using a write element wider than the track pitch to form a wide servo pattern as a method to make the write element wider than the track pitch. The Japanese Unexamined Patent publication No. 63-32705 disclosed a technique of shifting the write element by small pitches to erase data on a magnetic disk as a method of using the write element while shifting it. On the other hand, the Japanese Unexamined Patent publication Nos. 1-258209 and 5-28427 disclosed a technique of making the elements corresponding to the lower mode wider than the track pitch of the upper mode for two-mode floppy disk drives as a method of making elements wider than the track pitch. In any of the above techniques, the write element is not wider than the track pitch and does not use a method of overwriting the adjacent data track or tracks, and hence the track pitch can not be made narrower than the magnetic poles of the write element. Therefore, the above techniques differ basically from the technique of the present invention.

Second Embodiment

By providing a magnetic disk drive of the present invention with a shift address table and carrying out the shift operation by sectors or by tracks, the magnetic disk drive can be given performance suitable for more uses.

Figure 12:
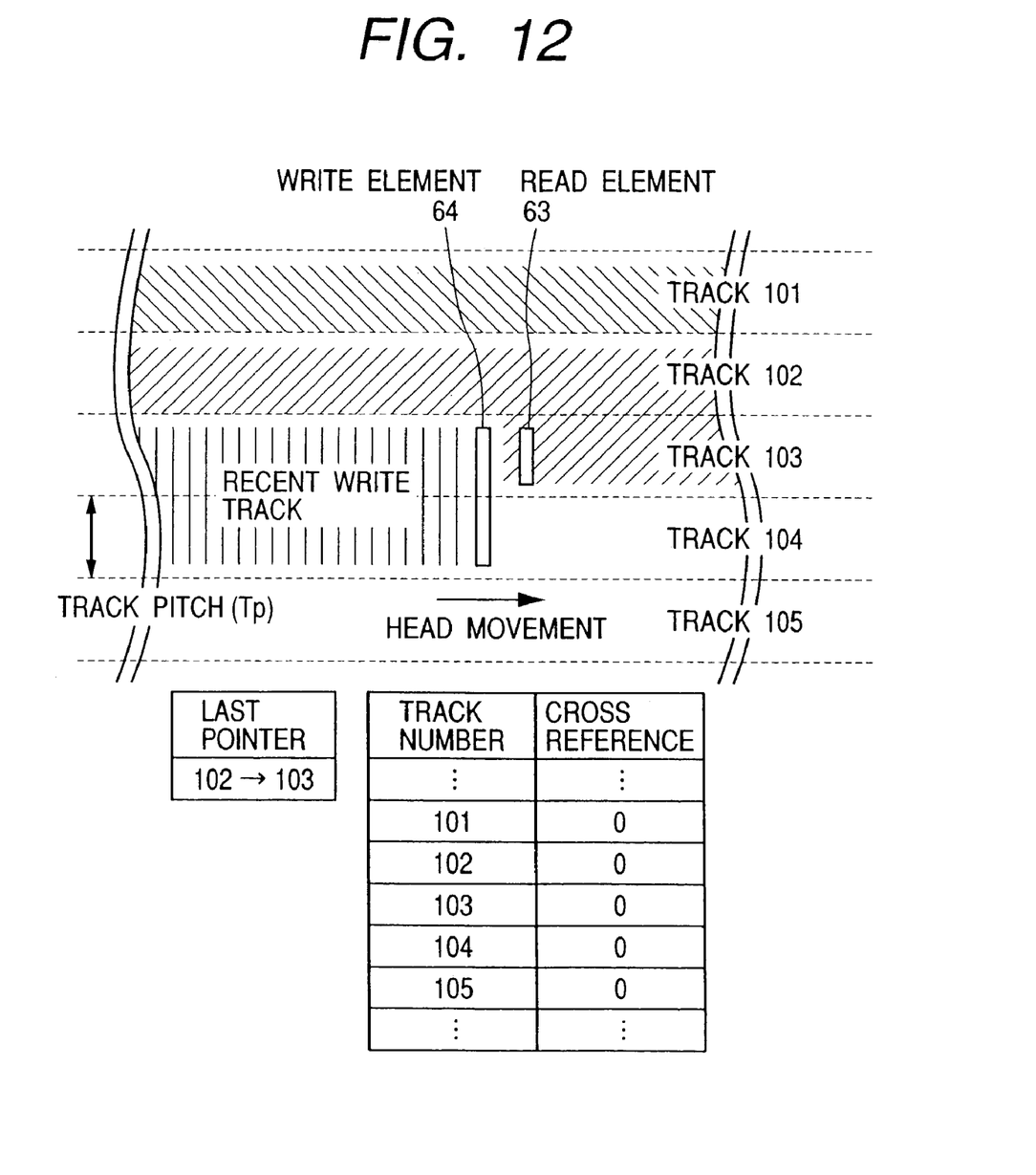
FIG. 12 is an illustration to show the new data recorded and to explain the process of renewing the contents of the shift address table when new data are recorded on the disk of a magnetic disk drive of the present invention.
Figure 13:
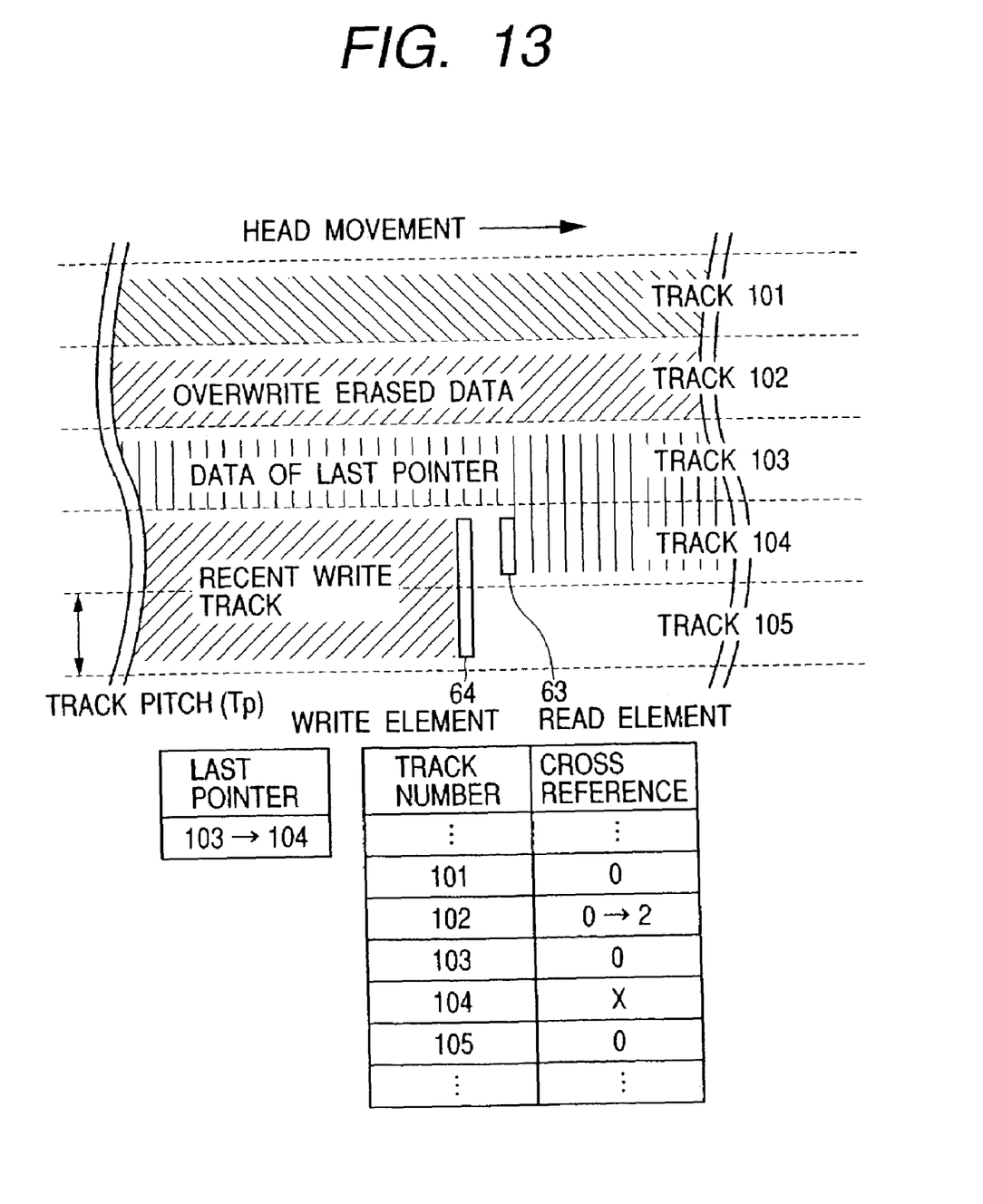
FIG. 13 is an illustration to show the new data recorded and to explain the process of renewing the contents of the shift address table when an area on the disk is overwritten in a magnetic disk drive of the present invention.

FIG. 12 shows the new data recorded and the process of renewing the contents of the shift address table when new data are recorded on a disk. FIG. 13 shows the new data recorded and the process of renewing the contents of the shift address table when an area on a disk is overwritten.

In FIG. 12, data are already written on up to the track 101 and track 102, and no data are written on the track 103 onward. The last pointer indicates the track 102. The initial values of the shift address table are all zero, indicating that no tracks have been shifted yet. To record new data, the write element 64 is kept over the tracks 103 and 104 by following control in accordance with the value (the number of the track on which data were last written) of the last pointer and writes new data on the track 103. Thereafter, the value of the last pointer is changed from 102 to 103.

In FIG. 13, data are already written on up to the track 103, and no data are written on the track 104 onward. The last pointer indicates the track 103. To overwrite the track 102, the write element 64 is kept over the tracks 104 and 105 by following control in accordance with the value of the last pointer and writes new data on the track 104. Thereafter, the value of the last pointer is changed from 103 to 104, the value of the track 102 in the shift address table is changed from "0" to "2", and the value of the track 104 in the shift address table is changed from "0" to the value "X" as referenced-track flag. To read the data of the track 102, the number "2" of the track 102 in the shift address table is read, "2" is added to "102" to find "104", and the data on the track 104 are read.

In the case of the magnetic disk drive of this embodiment, any track can be overwritten any number of times and the magnetic disk drive has almost the same capability of random access as conventional magnetic disk drives. In this embodiment, data are managed by tracks units in the shift address table to reduce a task on the hardware and the controller. To utilize the storage area on a disk more efficiently, data may be managed by sectors units in the shift address table to carry out shift operation of a higher degree.

Figure 14:
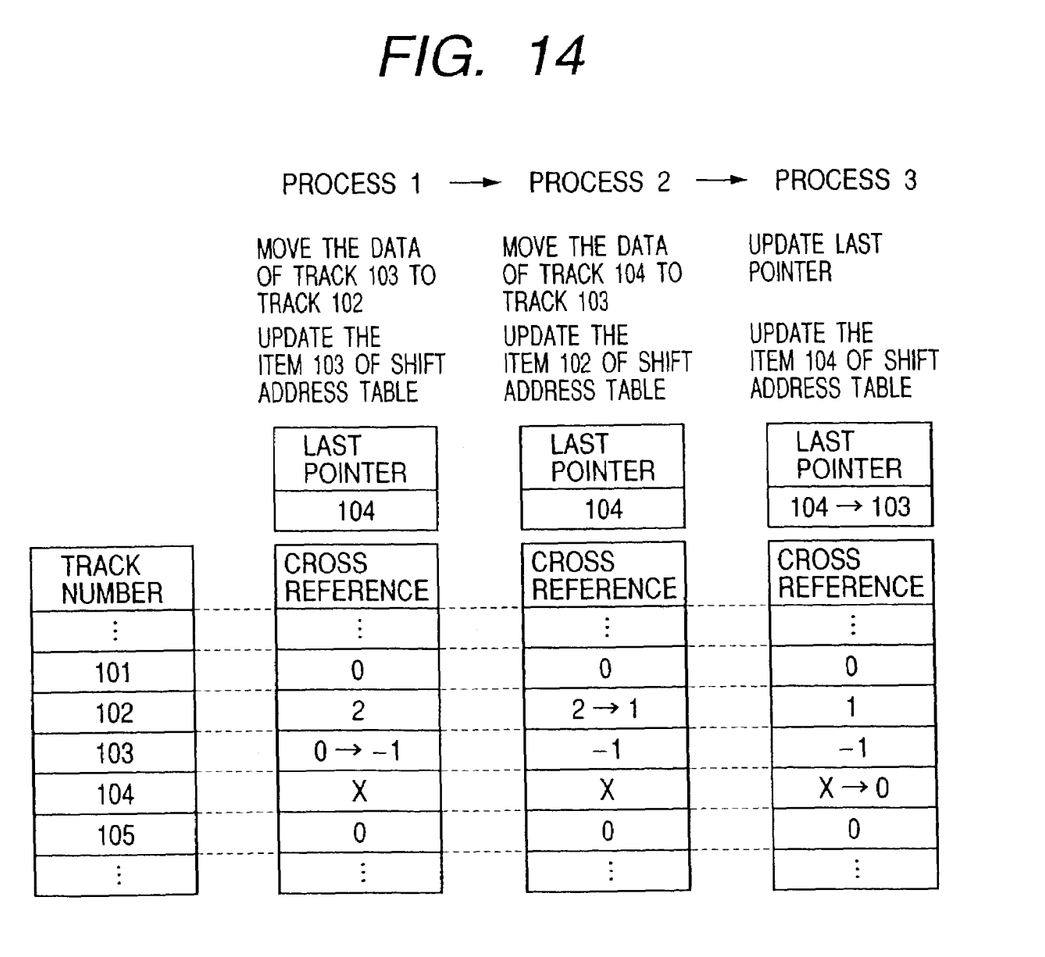
FIG. 14 is an illustration to explain the defragmentation process of the shift address table of a magnetic disk drive of the present invention.

In the case of this magnetic disk drive, by carrying out the defragmentation of the contents of the shift address table regularly, tracks or sectors to which access is no longer made due to shift operation can be restored to a usable state. In FIG. 13, the track 102 was shifted to the track 104. FIG. 14 shows the process of defragmentation and renewal of the contents of the shift address table.

In the step 1, the data of the track 103 are read, and the write element is positioned over the tracks 102 and 103 to write the read-out data. The value of the track 103 in the shift address table is changed from "0" to "−1". To read the data of the track 103, the number "−1" of the track 103 in the shift address table is read, "−1" is added to "103" to find "102", and the data on the track 102 are read. In the step 2, the data of the track 104 are read, and the write element is positioned over the tracks 103 and 104 to write the read-out data on the track 103. The value of the track 102 in the shift address table is changed from "2" to "1". To read the data of the track 102, the number "1" of the track 102 in the shift address table is read, "1" is added to "102" to find "103", and the data on the track 103 are read. In the step 3, the value of the last pointer is changed from "104" to "103", the value of the track 104 in the shift address table is changed from the value "X" as referenced-track flag to "0" to finish the defragmentation. Thus, the truck 104 can be restored to a usable state.

The defragmentation may be made at regular intervals appointed by the user or upon the user's instruction at any time. Although the defragmentation is usually made after there has been no access demand from the user for a prescribed time period, the magnetic disk drive of the present invention can respond to an access demand from the user even during the defragmentation.

Third Embodiment

Figure 15:
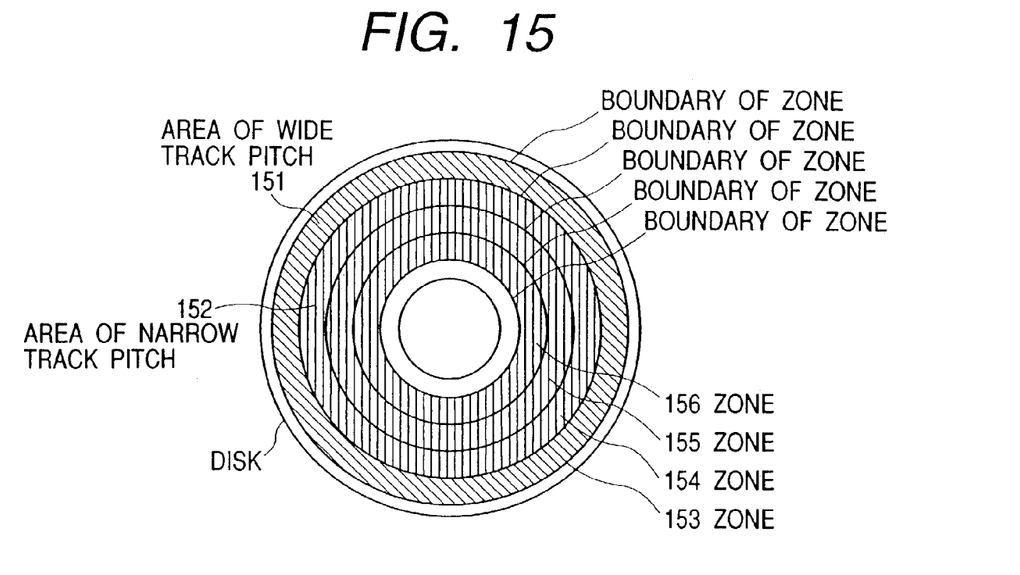
FIG. 15 shows a disk of an embodiment of magnetic disk drive of the present invention, wherein the most outer zone has a track pitch larger than the width of the write head.

A disk having four zones to improve performance of the magnetic disk drive of the invention will be described as an example. FIG. 15 shows the disk which has four zones 153 to 156. The zone 153 has 360 sectors in each track; the zone 154, 324 sectors; the zone 155, 288 sectors; the zone 156, 252 sectors. Each boundary between zones is provided with a dummy truck to prevent mutual interference which otherwise may occur due to the different sector arrangement between adjacent two zones.

Figure 16:
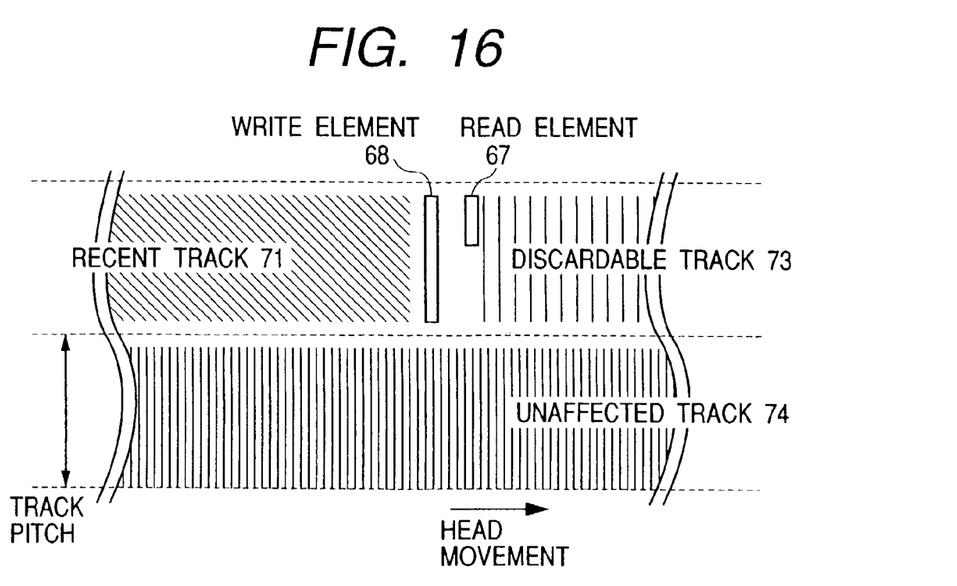
FIG. 16 is an illustration to explain the relation between the track pitch and the write- and read-element width in a wide track-pitch zone on a disk of an embodiment of magnetic disk drive of the present invention.

The zones 154, 155, and 156 constitute a small track-pitch area 152 wherein the width of the write and read element 64 and 62 and the track pitch fall into the relation shown in FIG. 1. The relation between the width of the write and read element 68 and 67 and the track pitch in the zone 153, or large track-pitch area 151, is shown in FIG. 16. Accordingly, old data can directly be replaced by new data, without shift operation by using a shift address table, in the zone 153. By storing data, which are soon replaced by other data, in the zone 153, the frequency of shift operation on the disk can be reduced, raising the efficiency in writing and reading data.

For instance, the file allocation table for the operating system to manage files, the RAM disk file, and the swap file of the system contain data which are frequently changed. Such operation of giving priority to and rearranging specific data in the zone 153 can be achieved by an application program higher in rank than the operating system.

The boundary between the large track-pitch area 151 and the small track-pitch area 152 is not prepared before shipment by a special device such as a servo track writer, but by a micro program in the magnetic disk drive. Therefore, after magnetic disk drives are shipped from the factory, individual users can optimize their disks in accordance with their use environment.

Figure 17:
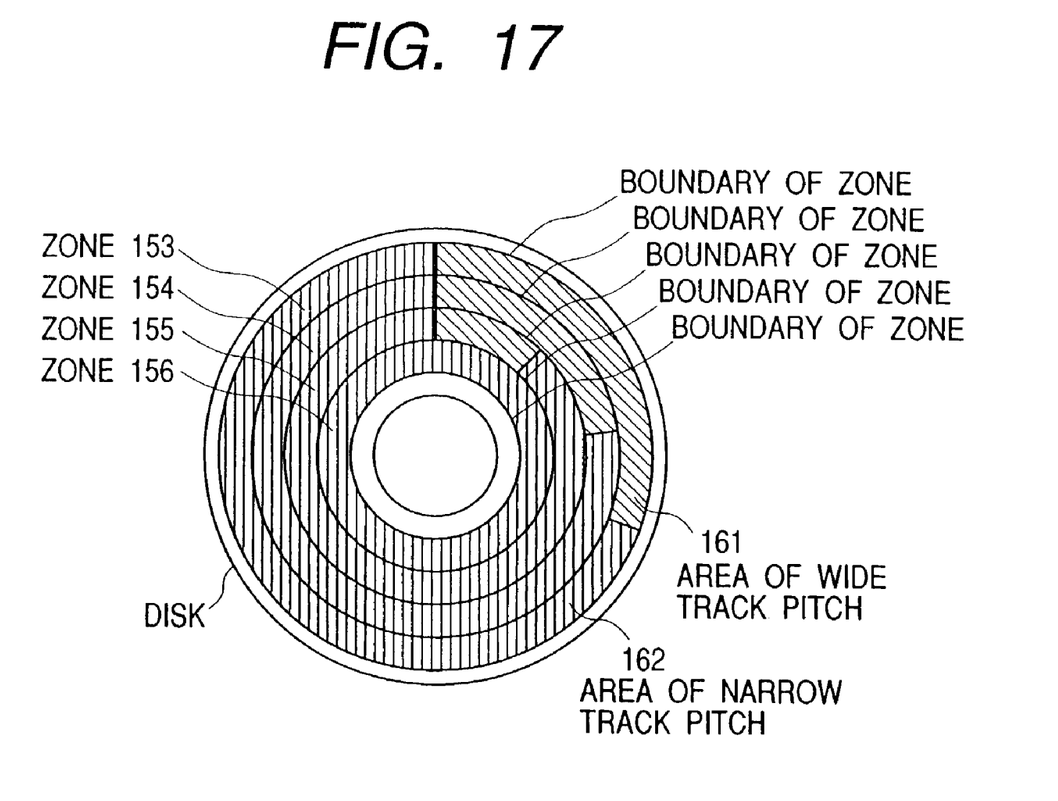
FIG. 17 shows a disk of an embodiment of magnetic disk drive of the present invention, wherein each of the three outer zones have an area where the track pitch is larger than the write-head width.

As the second example to divide a disk into several areas of different track pitches, part of each zone can be allocated to an area of the wide track pitch. FIG. 17 shows a disk which has four zones 153–156 each having different number of sectors in a track, as in FIG. 15. The most inner zone 156, of which each track has 252 sectors, belongs entirely to a small track-pitch area 162. The first 252 sectors of each track of each of the zones 155, 154, and 153 belong to the small track-pitch area 162, and the remaining sectors belong to a large track-pitch area 161. Thus, in the small track-pitch area 162, all the tracks have one and the same number of sectors. Accordingly, data can be managed by tracks in the shift address table to reduce the loads on the hardware and the controller.

Fourth Embodiment

Figure 10:
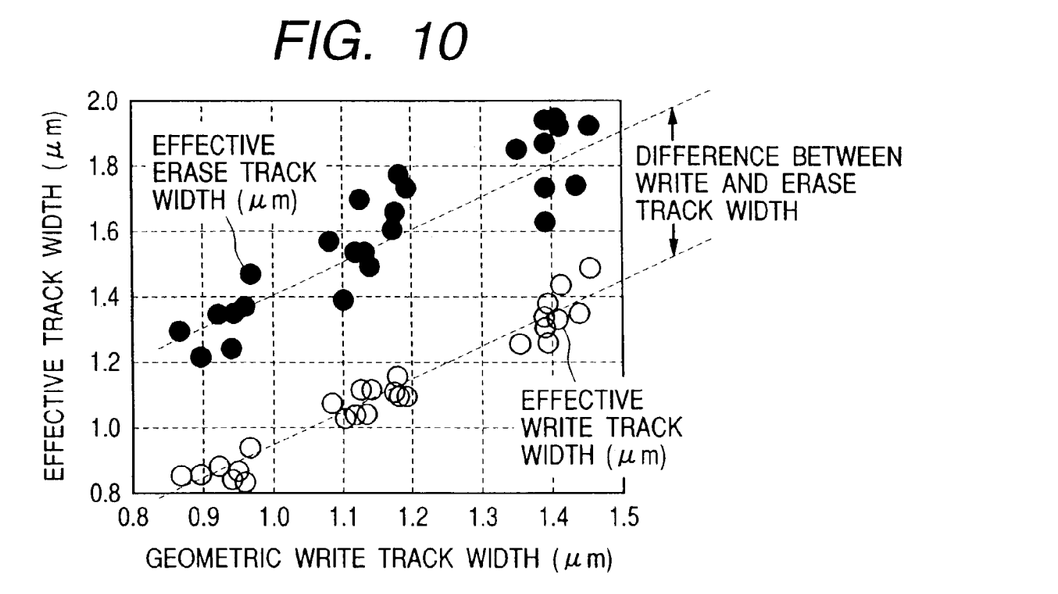
FIG. 10 is an illustration to explain the relation between the effective write-track width and the write-head width and the relation between the effective erase-track width and the write-head width.

The effective write-track width can be prescribed by the half-value width of the magnetization pattern recorded actually on the disk. The effective erase-track width can be prescribed by the half-value width of the substrate track overwritten by the magnetization pattern recorded actually on the disk. Heads with a write element 1.6 μm wide was trimmed by using the ion milling method to about 1.4, 1.1, and 0.9 μm. FIG. 10 shows the measurements of the effective write-track width and the effective erase-track width of the heads. The horizontal axis of the graph represents the geometric write-element width. It was found that the effective erase-track width was larger than the effective write-track width and the difference between them was constant at about 0.5 μm regardless of the variation of the geometric write-element width. It suggested that even if the geometric write-element width was reduced infinitely, the effective erase track remained at certain width.

Figure 11:
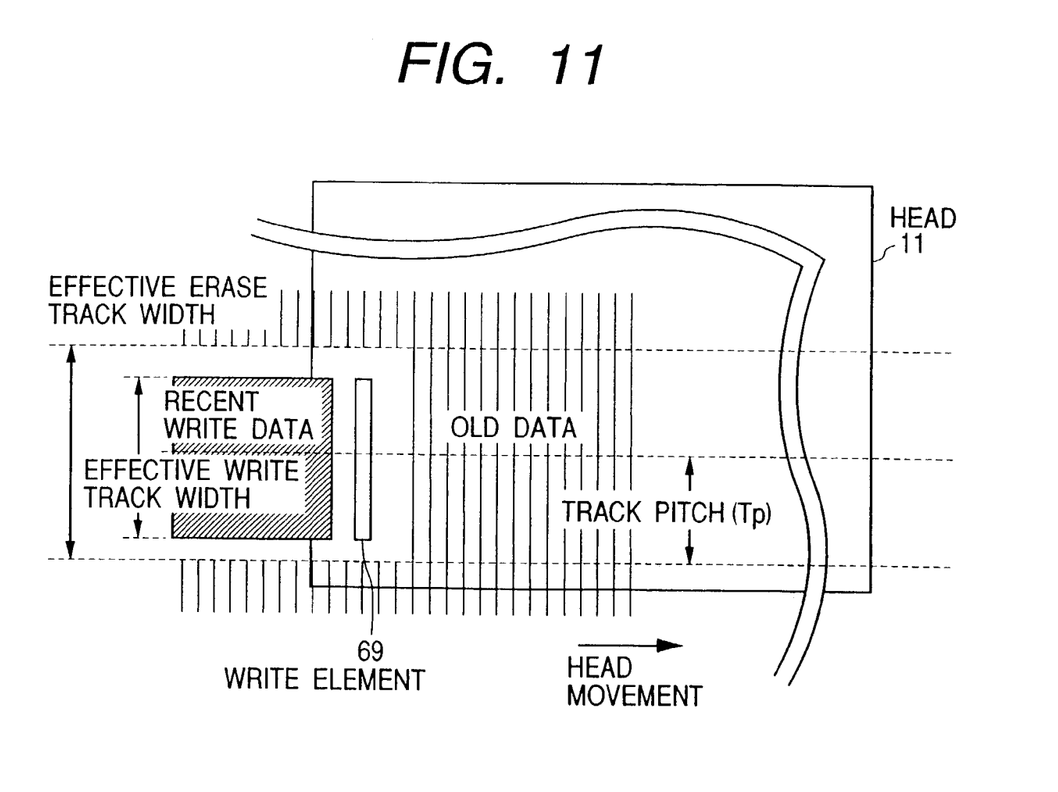
FIG. 11 is an illustration to explain the relation between the write- and the erase-track width and the track pitch of the fourth embodiment of magnetic disk drive of the present invention.

As shown in FIG. 11, the magnetic disk drive of this embodiment has heads which are so configured that the track pitch becomes half the effective erase-track width. In the case of convention magnetic disk drives, because the effective erase-track width is almost equal to the track pitch, it is necessary to reduce the geometric write-element width extremely. On the other hand, the write elements 69 of the magnetic disk drive of this embodiment of the present invention are wide enough to generate sufficiently strong magnetic fields, achieving an excellent overwrite characteristics and a high SN ratio. By applying the technique of sequential recording of the first embodiment, the technique of shift operation of the second embodiment, and the technique of different track-pitch areas of the third embodiment to this fourth embodiment, a magnetic disk drive with more excellent performance and larger capacity can be achieved.

Fifth Embodiment

The magnetic disk drive of the fifth embodiment uses the direct overwrite method of writing data on a track already holding data, the new data replacing the old ones. Therefore, old data can be masked with no erasing process, and hence high performance can be achieved. However, because the slightly remaining elements of the old data have the same clock frequency as the new data, the separation of the old elements is difficult and they are a direct factor to reduce the SN ratio. The ratio of the post-overwrite old-data signal strength to the pre-overwrite old-data signal strength is called "overwrite characteristics." The smaller the overwrite characteristics are, the smaller the noise elements is and, hence, the higher the SN ratio is. One criterion of the overwrite characteristics for the sufficient SN ratio is about −30 dB.

Figure 8:
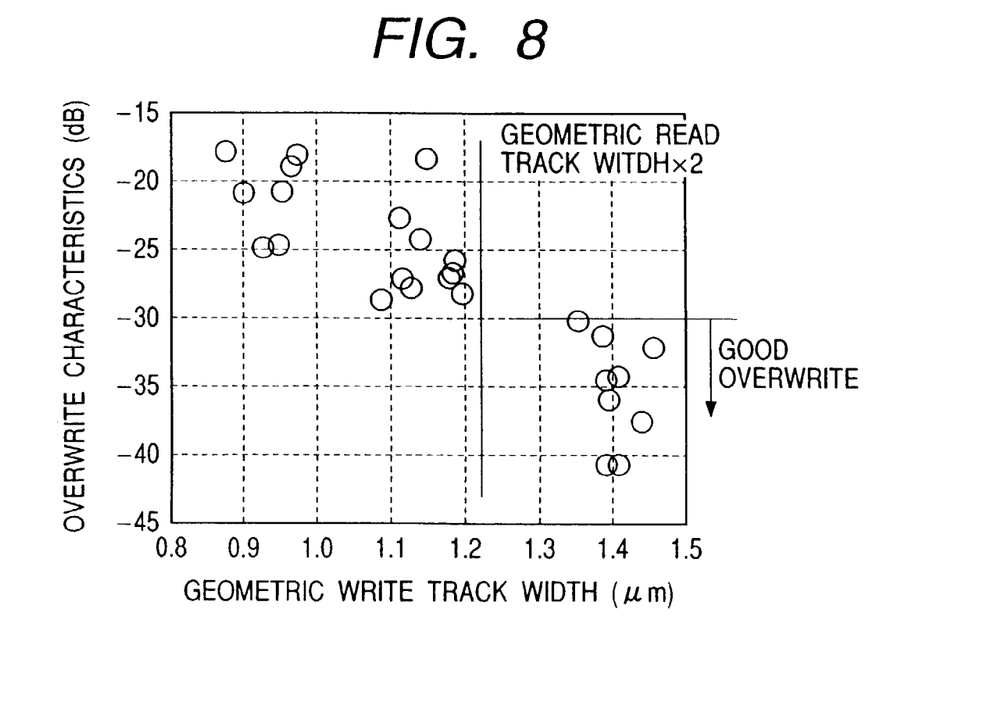
FIG. 8 is an illustration to explain the relation between the overwrite characteristics and the write-element width.

Heads with a write element 1.6 µm wide was trimmed by using the ion milling method to about 1.4, 1.1, and 0.9 µm. FIG. 8 shows the measurements of overwrite characteristics of the heads, the horizontal axis of the graph representing the geometric write-element width. It was ascertained that the overwrite characteristics decline as the geometric write-element width decreases. At this time, only the head with the write element 1.4 µm wide, which is wider than twice the geometric read-head width, displayed an overwrite characteristic better than −30 dB.

Figure 9:
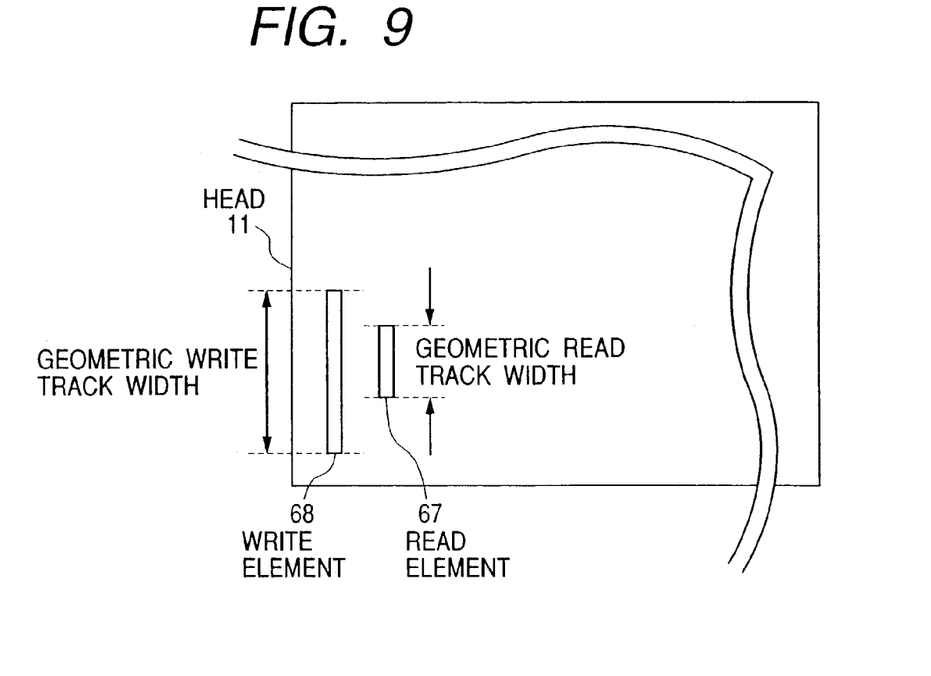
FIG. 9 is an illustration to explain the geometrical relation between the width of a write head and that of a read head of the third embodiment of magnetic disk drive of the present invention.

As shown in FIG. 9, the magnetic disk drive of this embodiment has a head wherein the geometric width of the write element 68 is more than twice the geometric width of the read element 67. In the case of conventional magnetic disk drives, the geometric width of the write element is 1.2 to 1.5 times the geometric width of the read element. Although the effective read-track width is almost the same as the geometric read-element width, it is required to reduce the geometric write-element width extremely as the effective read-track width is made smaller than the track pitch. The write elements 68 of the magnetic disk drive of the present invention are wide enough to generate sufficiently strong magnetic fields, achieving an excellent overwrite characteristics and a high SN ratio. By applying the technique of sequential recording of the first embodiment, the technique of shift operation of the second embodiment, and the technique of different track-pitch areas of the third embodiment to this fifth embodiment, a magnetic disk drive with more excellent performance and larger capacity can be achieved.

INDUSTRIAL APPLICABILITY

The present invention provides a magnetic disk drive with high track density and large storage capacity. The magnetic disk drive is provided with composite heads, of which each having a write element and a read element. The track pitch is smaller than the width of write tracks formed by the write elements so that the write elements can be wide enough to produce sufficiently strong magnetic fields.

Besides, the present invention provides a magnetic disk drive with random access capability. The data of any sectors can be replaced with new data by using a shift address table.

Moreover, the present invention provides a magnetic disk drive of high performance, which has a wide-pitched area on the disk wherein data can be directly replaced by new data and, thereby, the load on the controller is reduced.

The invention claimed is:

1. A magnetic disk drive provided with a composite head having a write element for writing magnetic information on a magnetic disk having tracks and a read element for converting magnetic information of the magnetic disk into electric signals, comprising:
    a head having a write element forming a write track width that is larger than a track pitch and the head having a read element forming a read track width that is smaller than the track pitch; and
    a means carrying out writing by shifting the write element in the radial direction of the magnetic disk track by track when writing the magnetic information on said magnetic disk and carrying out reading one track alone independently when reading the magnetic information from said magnetic disk.

2. A magnetic disk drive according to claim 1 comprising a head in which the geometric width of said write element is wider than twice the geometric width of said read element.

3. A magnetic disk drive according to claim 1,
    wherein the write track width formed by said write element is larger than the track pitch, the write track width formed by the write element is less wide than twice the track pitch, and
    an erase track width formed by the write element is about twice as wide as the track pitch.

4. A magnetic disk drive according to claim 1, wherein a shift address table controlling cross references of a physical address on said magnetic disk is provided and, when recent write information is to be replaced with new information, items of said shift address table are retrieved and updated.

5. A magnetic disk drive according to claim 1, wherein said magnetic disk is divided into two or more areas of different track pitches.

6. A magnetic disk drive according to claim 5, wherein said magnetic disk is divided into two or more zones having different number of sectors in one track by radii of the magnetic disk, and at least one of the zones is further divided into two or more areas of different track pitches.

7. A magnetic disk drive according to claim 5 or claim 6 comprising means for enabling individual users to optimize boundaries of two or more areas of different track pitches after the magnetic disk drive is shipped from the factory.

8. A magnetic disk drive according to claim 5 or claim 6, wherein means to store file allocation data for an operating system to manage files are provided in said two or more areas of different track pitches.

9. A magnetic disk drive provided with a composite head having a write element for writing magnetic information on a magnetic disk having tracks and a read element for converting magnetic information of the magnetic disk into electric signals, comprising:
    a head having a write element forming an erase track width that is approximately an integral multiple of a track pitch; and
    a means carrying out writing as shifting the write element in the radial direction of the magnetic disk track by track when writing the magnetic information on said magnetic disk and carrying out reading one track alone independently when reading the magnetic information from said magnetic disk.

10. A magnetic disk drive according to claim 9 comprising a head in which said write element has a geometric width that is wider than twice a geometric width of said read element.

11. A magnetic disk drive according to claim 9 comprising a head in which the write track width formed by said write element is larger than the track pitch, the read track width formed by the read element is less wide than twice the track pitch, and the erase track width formed by said write element is about twice as wide as the track pitch.

12. A magnetic disk drive according to claim 9, wherein a shift address table controlling cross references of a physical address on said magnetic disk is provided and, when recent write information is to be replaced with new information, items of said shift address table is retrieved and updated.

13. A magnetic disk drive according to claim 12 comprising means for carrying out a defragmentation of said shift address data table in accordance with instructions or demands from a user or interrupt requests from micro programs activated by a timer.

14. A magnetic disk drive according to claim 9, wherein said magnetic disk is divided into two or more areas of different track pitches.

15. A magnetic disk drive according to claim 14, wherein said magnetic disk is divided into two or more zones having different number of sectors in one track by radii of the magnetic disk, and at least one of the zones is further divided into two or more areas of different track pitches.

16. A magnetic disk drive according to claim 14 or claim 15 comprising means for enabling individual users to optimize boundaries of two or more areas of different track pitches after the magnetic disk drive is shipped from the factory.

17. A magnetic disk drive according to claim 14 or claim 15, wherein means to store file allocation data for an operating system to manage files are provided in said two or more areas of different track pitches.

* * * * *